United States Patent

Von Bebenburg

[11] 3,910,887
[45] Oct. 7, 1975

[54] AZABENZO-1,5-DIAZEPINES

[75] Inventor: Walter Von Bebenburg, Buchschlag, Germany

[73] Assignee: Deutsche Gold- und Silber-Schneideanstalt vormals Roessler, Germany

[22] Filed: Aug. 12, 1974

[21] Appl. No.: 497,119

Related U.S. Application Data

[63] Continuation-in-part of Ser. No. 330,108, Feb. 6, 1973, abandoned.

[30] Foreign Application Priority Data

Dec. 7, 1972 Australia.......................... 10442/72

[52] U.S. Cl. ................ 260/239.3 B; 260/294.8 R; 260/295 R; 260/296 R; 260/296 H; 424/263
[51] Int. Cl.² .............................. C07D 471/04
[58] Field of Search ............... 260/239.3 B, 296 H

[56] References Cited
OTHER PUBLICATIONS

Winterfeld et al., "Pharm Acta Helvetiae," Vol. 45, pp. 323–327, (1970).

*Primary Examiner*—Norma S. Milestone
*Assistant Examiner*—Robert T. Bond
*Attorney, Agent, or Firm*—Cushman, Darby & Cushman

[57] ABSTRACT

Azabenzo-1,5-diazepines are prepared of the formula:

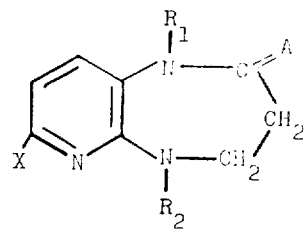

where X is halogen, preferably chlorine, $R_1$ is hydrogen, alkyl of 1 to 6 carbon atoms, or alkyl of 1 to 6 carbon atoms having a substituent which is dimethylamino or diethylamino, $R_2$ is phenyl or phenyl having one halogen substituent of atomic weight of 9 to 80, A is oxygen, sulfur, or alkylimino having 1 to 6 carbon atoms in the alkyl group, or the tautomeric forms of such compounds and salts with pharmacologically acceptable acids. The compounds are useful as sedatives and also as antiphlogistic agents and as anti-ulcer agents.

16 Claims, No Drawings

AZABENZO-1,5-DIAZEPINES

This application is a continuation-in-part of application Ser. No. 330,108 filed Feb. 6, 1973, now abandoned.

The invention is directed to new 6-azobenzo-1,5-diazepines of formula I

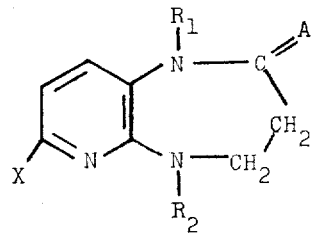

where X is halogen, preferably chlorine, $R_1$ is hydrogen, alkyl of 1 to 6 carbon atoms, or alkyl of 1 to 6 carbon atoms having a substituent which is dimethylamino or diethylamino, $R_2$ is phenyl or phenyl having one halogen substituent of atomic weight of 9 to 80, A is oxygen, sulfur, or alkylimino having 1 to 6 carbon atoms in the alkyl group, or the tautomeric forms of such compounds and salts with pharmacologically acceptable acids. The compounds are useful as sedatives and also as antiphlogistic agents and as anti-ulcer agents.

There can be prepared, for example, salts with acids such as hydrochloric acid, hydrobromic acid, succinic acid, tartaric acid, fumaric acid, sulfuric acid, citric acid, phosphoric acid, lactic acid, malonic acid, maleic acid, acetic acid, propionic acid, p-toluenesulfonic acid.

In the compounds of formula I the halogen atoms can have an atomic weight of 9 to 80, i.e., they can be chlorine, fluorine or bromine, preferably chlorine and fluorine. As the above named lower alkyl groups there can be employed those containing 1 to 6 carbon atoms, preferably 1 to 4 carbon atoms. The amino-alkyl group can contain 2 to 7 carbon atoms. Preferably the amino-alkyl group contains 2 to 5 carbon atoms.

Examples of groupings are methyl, ethyl, propyl, isopropyl, butyl, tert. butyl, hexyl, isobutyl, dimethylamino, diethylamino, dibutylamino.

The compounds of the invention have valuable pharmacodynamic properties. They especially possess marked sedative and anti-ulcer properties. Some of the compounds also have antiphlogistic properties.

In addition to the compounds mentioned in the working examples other compounds within the present invention include 5-phenyl-6-aza-7-bromo-2,3,4,5-tetrahydro-1H-1,5-benzodiazepin-2-one, 5-2′, 4′-dichlorophenyl-6-aza-8-bromo-2,3,4,5-tetrahydro-1H-1,5-benzodiazepin-2-one, 5-m-chlorophenyl-6-aza-7-fluoro-2,3,4,5, tetrahydro-1H-1,5-benzodiazepin-2,4-dione, 5-p-bromophenyl-6-aza-8-fluoro-2,3,4,5-tetrahydro-1H-1,5-benzodiazepin-2-one, 1-isobutyl-5-phenyl-6-aza-7-chloro-2,3,4,5-tetrahydro-1H-1,5-benzodiazepin-2-one, 1-β-dimethylaminoethyl-5-phenyl-6-aza-7-chloro-2,3,4,5-tetrahydro-1H-1,5-benzodiazepin-2-one, 1-β-diisopropyl-aminoethyl-6-aza-7-chloro-2,3,4,5-tetrahydro-1H-1,5-benzodiazepine-2,4-dione, 1-gamma-diethylaminopropyl-5-phenyl-6-aza-8-chloro-2,3,4,5-tetrahydro-1H-1,5-benzodiazepin-2-one, 5-phenyl-6-aza-7-chloro-2,3,4,5-tetrahydro-1H-1,5-benzodiazepin-2-thione, 2-imino-5-phenyl-6-aza-7-chloro-2,3,4,5-tetrahydro-1H-1,5-benzodiazepine, 2-methylamino-6-aza-7-chloro,2,3,4,5-tetrahydro-1H-1,5-benzodiazepine, 2-hexylamino-5-phenyl- 6-aza-7-chloro-2,3,4,5-tetrahydro-1H-1,5-benzodiazepine, 5-phenyl-6-aza-7-chloro-2,3,4,5-tetrahydro-1H-1,5-benzodiazepine.

The compounds of the invention can be produced by methods which are conventional as of themselves.

Thus (a) a compound of the formula:

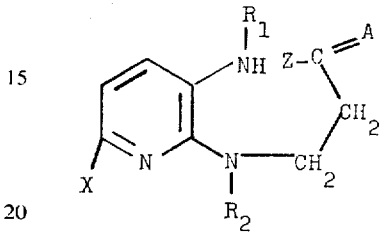

where X, $R_1$, $R_2$, $R_3$, A and B are as defined above and Z is a hydroxyl group, a mercapto group, a halogen atom, e.g., chlorine or bromine, an alkoxy group, e.g., methoxy or ethoxy, an amino group, an alkylamino group, e.g. methylamine or ethylamino, a dialkylamino group, e.g. dimethylamino or diethylamino, a benzoyloxy group, an aryloxy group, e.g. a phenoxy group, an acyloxy group, e.g. acetoxy, the group $-N_3$ or together with A is the cyano group cyclized to the 7-membered ring; or b. the substituent X is introduced into a compound having the formula:

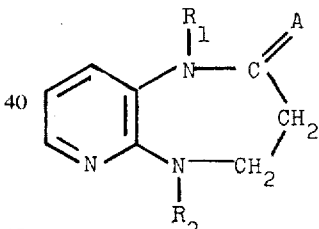

which also has a hydroxyl group or an etherified hydroxy group, in the 7 position by replacing the hydroxyl group or etherified hydroxyl group by the substituent X; or c. converting a compound having formula I in which the radical A is converted into another compound of formula I, and in a given case simultaneously or subsequently alkylating or acylating such compounds of formula I in which one of more of the groups $R_1$, and $R_2$ are hydrogen to form compounds of formula I where one or more of $R_1$ and $R_2$ are other than hydrogen.

Process (a) can be carried out with or without solvents by heating to 50° to 250°C., in a given case with addition of a customary condensation agent for this type or reaction. As solvents there can be used, for example, aliphatic alcohols (e.g. methanol, ethanol, isopropanol, propanol or butanol), dioxane, dimethyl formamide, benzene, toluene, xylene, glacial acetic acid, polyphosphoric acid or concentrated sulfuric acid. The last two acids at the same time act as condensation agents which can also be used with other condensation agents. As condensation agents there also can be used metal-especially alkali alcoholates, e.g. sodium methylate, or potassium ethylate, alkali amides, e.g. sodamide or potassium amide, alkali hydrides, e.g. lithium hydride, sodium hydride or potassium hydride, $ZnCl_2$ pyridine hydrochloride, strong acids such as HCl, toluene sulfonic acid, trifluoro-acetic acid as well as dehydrating agents such as dicyclohenxyl carbodiimide, 1,1-carbonyldiimidazole, N-ethoxycarboxy-2-ethoxy-1,2-dihydroquinoline, etc. As halogen atoms which can react (as the Z constituent) there are especially employed chlorine or bromine; also there can be used the halogen-like group —$N_3$. When Z is alkoxy, alkylmercapto, alkylamino or dialkylamino, generally there are used such groups wherein the alkyl radical has 1 to 6 carbon atoms, e.g. methoxy, ethoxy, isopropoxy, hexoxy, methylmercapto, hexyl mercapto, sec. butylmercapto, methyl amino, hexylamino, dimethylamino, diethylamino or dialkylamino. If Z is acyloxy, preferably an aliphatic acyloxy group of 2 to 6 carbon atoms, e.g. acetoxy, propionoxy, valeroxy or hexanoxy is employed. If Z is an aryloxy group, preferably it is phenoxy.

If $R_1$ is hydrogen, then process (a) can be carried out so that the two amino groups of formula II can have protective groups. Frequently such protective groups are necessary for the production of the starting compounds.

In many cases the splitting off of such a protective group takes place simultaneously with the cyclization.

These protective groups are easily split off. There are employed either easily solvolytically splittable acyl groups or groups splittable by hydrogenation, as for example, the benzyl radical. The solvolytically splittable protective groups are split off, for example, by saponification with dilute acids or by means of basic substances (potash, soda, aqueous alkali solutions, alcoholic alkali solutions, $NH_3$) at room temperature or with a short boiling. Hydrogenizably splittable groups such as the benzyl group or the carbobenzoxy radical are suitably splitt off by catalytic hydrogenation in the presence of customary hydrogenation catalysts, especially palladium catalysts, in a solvent or suspension agent, in a given case under elevated pressure. As solvents or suspension agent there can be used water, lower aliphatic alcohols such as methyl alcohol, ethyl alcohol, isopropyl alcohol, butyl alcohol, cyclic ethers such as dioxane or tetrahydrofurane, aliphatic ethers, e.g. diethyl ether, dimethyl formamide, etc. as well as mixtures of these materials.

As protective groups for the amino group there can be used for example, the benzyl group, α-phenylethyl group, benzyl groups substituted in the benzene nucleus as for example, the p-bromo or p-nitrobenzyl group, the carbobenzoxy group, the carbobenzthio group, the trifluoroacetyl, the phthalyl radical, the trityl radical, the p-toluenesulfonyl radical and similar groups as well as simple acyl groups such as the acetyl group, formyl group, tert. butylcarboxy group, etc. There can be employed especially the protective groups used in the synthesis of peptides and the splitting processes customarily employed in that process. Among others for this purpose reference is made to Jesse P. Greenstein and Milton Winitz "Chemistry of Amino Acids", John Wiley and Sons, Inc. New York (1961) Vol. 2, pages 883 et seq. Also there can be used carbalkoxy groups (for example of low molecular weight such as carbmethoxy, carbethoxy and carbpropoxy).

In process (b) the introduction of X takes place by treatment with customary halogenation agents (X is halogen, e.g., Cl, Br or F) or by nitration (X is $NO_2$) at temperatures between —20 and +100°C. As solvents there can be used polar solvents such as acetic acid, acetic anhydride, sulfuric acid, etc. Stoichiometric amounts of nitric acid are suitable for nitration. The halogenation generally takes place under the same conditions. As solvents there can additionally be used haloforms, e.g. chloroform, or other halogenated hydrocarbons, e.g. carbon tetrachloride or tetrachloroethane. As halogenation agents there can be used for example, elemental halogens, especially chlorine, bromine, inorganic polyhalogen compounds such as phosphorous pentachloride, cobalt (III) fluoride, sulfuryl chloride, hypohalites or an amine or amide halogenated on the nitrogen atom as for example, dichlorourea, N-bromoacetamide, iodine in the presence of ammonia, etc.

In case the starting compound of formula III contains an etherified hydroxy group in the 7 position, there are especially employed alkoxy groups, for example having 1 to 6 carbon atoms, e.g. methoxy, ethoxy or hexoxy, or the phenoxy group. Process (b) is then carried out for example, at elevated temperature (50° to 200°C.) with halogenation agents such as phosphorus oxychloride, phosphorus pentachloride, thionyl chloride, etc., in a given case with addition of inert solvents.

As inert solvents there can be used for example, benzene, toluene, xylene, etc. Frequently it is advantageous to use the halogenation agent in excess.

In case the starting compound of formula III contains an amino group in the 7 position, the effect of the halogenation agent takes place preferably in combination with a diazotization (Sandmeyer reaction or modified Sandmeyer reaction) in the presence of the corresponding halogen ion and/or the corresponding copper (I)-salt or the fluoroborate ion. It is likewise possible to isolate the intermediate product of the Sandmeyer reaction and to thermally decompose it.

Group A in a compound of formula I in known manner can be exchanged in process (c). Thus, in case A is oxygen, this oxygen can be replaced by sulfur by means of an inorganic sulfide, for example phosphorus pentasulfide. This reaction takes place especially in inert solvents such as benzene, toluene, xylene, dioxane, pyridine or chlorinated hydrocarbons such as chloroform or ethylene tetrachloride at temperatures between 0° and 200°C.

Compounds in which A is oxygen or sulfur can be reacted in polar media with ammonia, ammonia derivatives or primary alkylamines with 1 to 6 carbon atoms, e.g. methylamine, ethylamine, isopropylamine or hexylamine whereby compounds of formula I are formed in which A is imino or alkylimino. The reaction is preferably carried out in polar solvents such as methanol, ethanol, or isopropanol or excess amine at temperatures between —40 and + 150°C.

In compounds of formula I in which A is sulfur the sulfur can be exchanged for oxygen by reaction with inorganic oxides (especially heavy metal oxides such as mercuric oxide, silver oxide, manganese dioxide), hydrogen peroxide, hydrogen peroxide derivatives) nitric acid or nitrous gas.

Compounds of formula I in which B is oxygen or sulfur can be converted into compounds of formula I in which B is two hydrogen atoms by reduction. This reduction can be carried out for example, in a solvent or suspension agent at temperatures between 0° and 100°C. As solvents or suspension agents there can be used for example, lower aliphatic alcohols, e.g. methanol or ethanol, cyclic ethers such as dioxane or tetrahydrofurane, aliphatic ethers, e.g. diethyl ether, dimethyl formamide, tetramethyl urea, etc. as well as mixtures of these agents. Preferably this reduction is undertaken by catalytic hydrogenation. As catalysts there can be used customary finely divided metal catalysts such as for example, nickel (Raney-nickel) or cobalt (Raney-cobalt). The catalysts can be employed with or without carriers. There can be employed normal pressure or elevated pressure.

The reduction of the keto or the thioketo group can also take place through metal hydrides or complex metal hydrides such as LiH, Li Al $H_4$, alkali borohydrides, e.g. sodium borohydride, sodium-triethoxy-aluminum hydride or sodium dihydro-bis(2-methoxyethoxy) aluminate.

Generally process (c) is carried out for example, in a temperature range between —40° and + 200°C. As solvents there can be used for example, toluene, benzene, xylene, pyridine, lower aliphatic alcohols such as methanol, ethanol, propanol or isopropanol, acetone, dioxane, tetrahydrofurane or liquid ammonia or an excess of the primary amine used as reagent. The subsequent introduction of the $R_1$ and/or $R_2$ radicals by alkylation or arylation takes place by known methods. For example, compounds of formula I wherein one or more of the $R_1$, and $R_2$ radicals are hydrogen, be alkylated in known manner. As alkylating agents there can be used, for example, esters of the formula R-Hal, $ArSO_2OH$ and $SO_2(OR)_2$ wherein Hal is a halogen atom (especially chlorine, bromine or iodine) and Ar is an aromatic radical which, in a given case, is a phenyl or naphthyl radical substituted by one or more lower alkyl groups, e.g. methyl or ethyl and R is alkyl of 1 to 6 carbon atoms, e.g. methyl, ethyl or hexyl, an alkyl with 1 to 6 carbon atoms substituted by an alkoxy group with 1 to 6 carbon atoms, e.g. methoxy or hexoxy, or a dialkylamino group with 2 to 12 carbon atoms, e.g. dimethylamino or dihexylamino or by a cycloalkyl group with 3 to 6 carbon atoms, e.g. cyclopropyl, cyclopentyl or cyclohexyl or R can be alkenyl with 2 to 6 carbon atoms, e.g. vinyl, allyl, methallyl, crotyl, a cycloalkyl group with 3 to 6 carbon atoms, e.g. cyclopropyl, cyclopentyl or cyclohexyl, a phenyl group, a phenyl group substituted once or twice by bromine, chlorine, fluorine, nitro, cyano and/or trifluoromethyl, or a pyridyl-(2)-group. For example, there can be used p-toluenesulfonic acid alkyl esters, e.g. methyl p-toluenesulfonate, and ethyl p-toluenesulfonate, p-toluenesulfonic acid cycloalkyl esters, e.g. cyclohexyl-p-toluenesulfonate, lower dialkyl sulfates, e.g. dimethyl sulfate, diethyl sulfate and dipropyl sulfate and the like.

The alkylation reaction can take place, in a given case, with addition of customary acid binding agents such as alkali carbonates, e.g. sodium carbonate and potassium carbonate, pyridine or other customary tertiary amines, at temperatures between 0° and 280°C. in inert solvents such as lower aliphatic alcohols, e.g. methyl alcohol, ethyl alcohol and t-butyl alcohol, dioxane, pyridine, quinoline, dimethyl formamide, dimethyl sulfoxide, aromatic hydrocarbons, such as benzene, toluene or xylene, or acetone or higher aliphatic ketones or ether alcohols (for example, diethylene glycol). Suitably, operation is carried out in the presence of an acid acceptor as for example, sodamide, sodium hydride or finely divided sodium (in inert solvents, e.g. benzene), potash, sodium carbonate, tert. amines (e.g. triethylamine, diisopropylmethyl amine, pyridine). It is also to first convert the starting diazepine to the corresponding metal salts.

In a given case the use of catalysts is also favorable. As catalysts there can be used above all heavy metal salts such as Cu(I) Cl, copper bronze, nickel salts, cobalt salts or iron salts.

The subsequent introduction of the radicals $R_1$, and/or $R_2$ by acylation can take place by known methods. It can take place in inert solvents or suspension media such as those set forth above for alkylation, preferred solvents being dioxane, dimethyl formamide, benzene or toluene, at temperatures between 0° and 200°C. As acylation agents there can be used ketenes, e.g. ketene itself, acid halides, e.g. acetyl chloride or propionyl bromide, acid anhydrides, e.g. acetic anhydride or acid esters of aliphatic carboxylic acids with 2 to 6 carbon atoms or carboxylic acid half ester halides with 1 to 6 carbon atoms, in a given case, with the addition of an acid binding agent such as potassium carbonate or sodium methylate or a tertiary amine, for example, triethylamine. There are especially employed esters with lower aliphatic alcohols, e.g. methyl alcohol, ethyl alcohol, butyl alcohol. In the alkylation and acylation one can also proceed in such a manner that first there is produced from the reacting diazepine of formula I where one or more of $R_1$ to $R_3$ is H an alkali compound, by reacting with the compound of formula I an alkali metal, alkali hydride or alkali amine (especially sodium or sodium compounds) in an inert solvent such as dioxane, dimethyl formamide, benzene or toluene at temperatures between 0° and 150°C. and then the alkylating or acylating agent is added.

In place of the alkylation and acylation agents mentioned there can also be used other chemically equivalent agents (see for example, L. F. and Mary Fieser "Reagents for Organic Synthesis", John Wiley and Sons, Inc. New York, 1967 Vol. 1, pages 1303-4 and Vol. 2, page 471 and Vol. 3 (1972), page 349. It should be understood that acyl groups present in the compounds of formula I also can be split off again in known manner.

Basic compounds of formula I can be converted in known manner into their salts. As anions for these salts there can be used the known therapeutically usable acid radicals such as those set forth previously.

The free bases of the compounds can be prepared from their salts in customary fashion, for example, by treating a solution in an organic agent such as alcohols, e.g. methanol, with soda or soda lye.

Those compounds of formula I which contain asymmetric carbon atoms and as a rule result as racemates, can be split into the optically active isomers in known manner with the help of an optically active acid. However, it is also possible to employ from the beginning an optically active starting material whereby a correspondingly optically active or diastereomer form is obtained as the end product.

The compounds of formula I can also be present in their corresponding tautomeric forms. In these cases, for example, the $R_1$ radical replaces A while simultaneously the double bond leaving A is shifted to the diazepine ring between the carbon atom and the adjacent nitrogen atom. Likewise there is possible tautomerism between the three hydrogen atoms of the diazepine ring and A. The compounds can be present entirely or partially in one of the possible tautomeric forms. In general, under normal working and storage conditions, an equilibrium is present.

The compounds of the invention are suitable for the production of pharmaceutical compositions. The pharmaceutical compositions or medicaments can contain one or more of the compounds of the invention or mixtures of the same with other pharmaceutically active materials. For the production of pharmaceutical preparations there can be used the customary pharmaceutical carriers and assistants. The medicines can be employed enterally, parenterally, orally or perlingually. For example, dispensing can take place in the form of tablets, capsules, pills, dragees, plugs, salves, jellies, cremes, powders, liquids, dusts or aerosols. As liquids there can be used, for example, oily or aqueous solutions or suspensions, emulsions, injectable aqueous and oily solutions or suspensions.

The starting compounds used for processes (a), (b) and (c), insofar as they are not known, can be obtained in the following manner.

Process (a)

A compound of the formula:

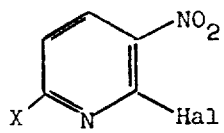

IV is reacted with a compound of the formula:

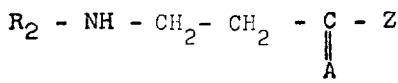

V where $R_2$ is as defined above, A is oxygen and Z is defined as set forth above except for halogen, $NH_2$, alkylamino and azido ($-N_3$) to form compounds of the formula:

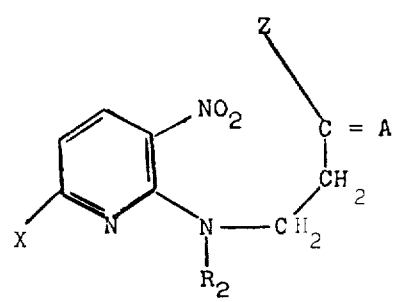

VI

Generally the process is carried out in a solvent such as a lower aliphatic alcohol, e.g. methanol, ethanol or isopropanol, dioxane or dimethyl formamide with addition of an acid binding agent such as sodium hydride, sodium amide, finely divided sodium reacted in inert solvent, e.g. benzene, or potash, sodium carbonate, a tertiary amine, e.g. triethylamine, or the like.

Acid acceptors capable of reaction such as sodium hydride, sodium amide, potash or tertiary amines, e.g. triethylamine or pyridine, can be used. The temperature for the reaction is between 0° and 150°C.

Compounds of formula II in which Z is halogen, can be obtained, for example, from compounds of formula II in which Z is OH by reaction with halogenation agents such as thionyl chloride or phosphorus pentachloride at temperatures between 0° to 100°C. in inert solvents such as benzene, toluene, dioxane or tetrahydrofurane. The carboxylic acids of formula II (Z is OH) can be obtained, for example, from the corresponding esters (Z is alkyloxy, e.g. methoxy or t-butoxy, aryloxy, e.g. phenoxy, or benzyloxy) by converting the esters to acids under mild conditions, for example, by hydrogenation (when Z is benzyloxy) or by very mild hydrolysis (for example, when Z is aryloxy or branched alkoxy as tert. butoxy).

Compounds of formula II in which Z is an acyloxy group can also be obtained from the corresponding halides by reacting with the corresponding metal salts of the carboxylic acid, for example, with sodium acetate or silver benzoate in inert solvents such as alcohols, e.g. methanol or ethanol, acetone, dioxane, ether at temperatures between $-20°$ and $+100°C$.

Compounds of formula II in which Z is an azido group can be obtained, for example, from the corresponding halide by reaction with alkali azides, e.g. sodium azide in inert solvents such as acetone, dioxane, dimethyl sulfoxide at temperatures between 0° and 100°C. or from esters (Z is O-alkyl or O-aryl) by reaction of the ester with hydrazine, is a given case, in an inert solvent such as ethanol, dioxane or tetrahydrofurane at 0° to 100°C. and subsequent reaction with nitrous acid or nitrous gases in inert solvents such as alcohols, e.g. methanol or ethanol, dioxane, dimethyl formamide (or such solvents admixed with water) at temperatures between 0° and 50°C.

Compounds of formula VI wherein A is sulfur, can be produced from compounds of formula VI wherein A is oxygen by treatment with $P_2S_5$ in inert solvents such as benzene, toluene, pyridine or dioxane at temperatures between 20° and 110°C. The sulfur in the compounds thus obtained, can be exchanged for an imino or alkylimino group (or the corresponding tautomeric form) by treatment with ammonia or an alkyl amine, e.g. ethyl amine. The compounds wherein A is =NH or alkylimino can also be produced from compounds of formula VI in which the group —CZA is the cyano group by taking up $H_2S$ or adding HCl to the imide chloride and in both cases subsequently reacting with an alkylamine or ammonia. As solvents there can be used in addition to the alcohols mentioned above an excess of ammonia or amine when the amine or ammonia is used as a reactant.

The starting materials of formula V insofar as they are not known, can be obtained as follows.

An amine $R_2—NH_2$ where $R_2$ is defined as above, is reacted with a compound of the formula:

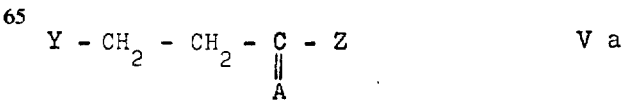

Va where A, R and Z are as defined above (except for halogen, NH₂, alkylamino and azido for Z) and Y is a chlorine or bromine atom, an azido group or an alkoxy group or an aryloxy group, in an inert solvent such as dioxane, tetrahydrofurane, chloroform, acetone or an excess of the compound Va at temperatures between 0° and 200°C. The reaction can be carried out, for example, in a manner analogous to Chem. Ber. Vol. 17, pages 739 et seq. (1884) or J. Indian Chem. Soc. Vol. 37, pages 591–593 (1960).

In compounds of formula VI the one, two or three nitro groups (depending on what X is) can be reduced to amino groups whereby the amino compounds of formula II are formed in which R₁ is hydrogen (all the other symbols are as already defined). The R₁ radical can then be introduced, for example, by alkylation or acylation according to process (c).

The reduction of the nitro group can be carried out catalytically (with Pd, Pt, Raney-Ni, in alcohols, e.g. methanol or ethanol, dioxane, or tetrahydrofurane at a temperature between 0° and 60°C. and at 1 to 50 atmospheres absolute) or chemically (with Li Al H₄ or Al/Hg/H₂O in ether, dioxane, or tetrahydrofurane at a temperature between 0° and 60°C.)

A nitro group can be introduced into the pyridine ring of the compounds of formula II thus obtained by nitration, generally working at temperatures between −20 and +100°C. Suitably there is employed as nearly as possible stoichiometric amounts of HNO₃. As solvents there can be used polar agents such as acetic acid, acetic anhydride, sulfuric acid and the like. The nitro group thereby enters the pyridine ring in the 2 or 3 position, preferably in the 3-position.

2-(N-carbethoxyacetyl)-phenylamino-3-amino-6-chloropyridine can be obtained, for example, as follows.

There were added 15 grams of sodium hydride (8% in white oil) with stirring to a solution of 100 grams of malonic acid ethyl ester monoanilide in 500 ml of dimethyl formamide under a nitrogen atmosphere with cooling and the mixture stirred for another 30 minutes. Then there was dropped in with cooling at 20° to 25°C., a solution of 100 grams of 2,6-dichloro-3-nitropyridine in 150 ml of dimethyl formamide. It was further stirred for one hour at 20° to 25°C., then 50 ml of ethanol and 25 ml of glacial acetic acid added, the solvent evaporated in vacuum on the rotary evaporator; the residue agitated several times with water and the half crystalline mass then dissolved in hot ethanol. Upon cooling the desired substance crystallized out, it was recrystallized from ethanol. Yield 29 grams, M.P. 179° to 181°C. 32 grams of the thus obtained nitropyridine were then hydrogenated in 500 ml of methanol with addition of 10 grams of Raney-nickel at 20 atmospheres absolute and 40° to 50°C. It was filtered off as much as possible while warm with suction; the desired amino compound for the most part crystallized out from the mother liquor; by concentration of the mother liquor a further amount was obtained. Yield 26 grams; M.P. 160° to 161°C.

Compound of formula II can also be obtained in the following manner:

A compound of the formula:

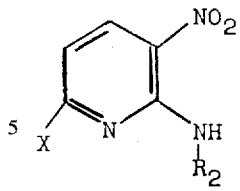

VII is reacted with a compound of the formula:

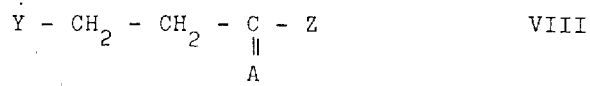

VIII in an inert solvent, with or without addition of an acid acceptor, to form a compound of formula VI. In formula VIII Z has the meanings set forth above, A is oxygen and Y is a negative group such as a halogen atom, e.g. chlorine or bromine, or an azido group.

Thereupon the one, two or three nitro groups are reduced to amino groups.

The required substituted pyridine groups of formula VII insofar as they are not known, can be obtained from the corresponding substituted 2-halo-3-nitropyridines. Thereby in each case the two halogen atoms are first reacted with the corresponding amine R₂—NH₂ or with ammonia. One can proceed, for example, in a manner analogous to the method set forth in Belgian patent 764,794, the entire disclosure of which is incorporated by reference.

Thus, for example, there is obtained 2-carbethoxyacetylamino-3-nitro-5-chloropyridine as follows:

A mixture of 20 grams of 2-amino-3-nitro-5-chloropyridine, 20 grams of malonic acid ethyl ester chloride and 250 ml of toluene were heated at reflux for 90 minutes, then there were added 5 grams more of the malonic acid ethyl ester chloride and the mixture heated for an additional 60 minutes. After standing overnight the precipitated crystals were filtered off, the solution shaken several times with aqueous sodium bicarbonate solution and then with water, the organic phase dried and distilled in a vacuum in the rotary evaporator. The residue was recrystallized from ethanol-gasoline. Yield 30 grams; M.P. 88° to 90°C.

Process (b)

The starting materials for process (b) are made according to process (a) wherein in formula II X is H. The starting materials of formula II where X is H, are made in an analogous manner to that specified for the starting materials for process (a).

Unless otherwise indicated, all parts and percentages are by weight.

EXAMPLE 1

5-Phenyl-6-aza-7-chloro-2,3,4,5-tetrahydro-1H-1,5-benzodiazepin-2-one 30 grams of 2-(N-β-carboxyethyl-phenyl-amino)-3-amino-6-chloropyridine were heated for an hour under nitrogen at 150° to 160°C. The initially syrupy material thereupon became solid. It was recrystallized twice from dimethyl formamide. Yield 16 grams; M.P. 270° to 275°C.

EXAMPLE 2

5-o-Fluorophenyl-6-aza-7-chloro-2,3,4,5-tetrahydro-1H-1,5-benzodiazepin-2-one 28 grams of 2-(N-β-carbethoxy-ethyl-o-fluorophenyl-amino)-3-amino-6-chloropyridine were reacted as in example 1 and purified. Yield 12 grams; M.P. 264° to 267°C.

EXAMPLE 3

1-Methyl-5-phenyl-6-aza-7-chloro-2,3,4,5-tetrahydro-1H-1,5-benzodiazepin-2-one

There was added under nitrogen at room temperature 6 grams of sodium hydride (80% in white oil) to a mixture of 28 grams of 5-phenyl-6-aza-7-chloro-2,3,4,5-tetrahydro-1H-1,5-benzodiazepin-2-one and 350 ml of dimethyl formamide and the mixture was then stirred for 30 minutes. There were slowly dropped in 21 grams of methyl iodide whereupon the temperature increased to 45°C. The mixture was stirred for another hour at 50°C., then 50 ml of ethanol were added and the solution evaporated in a vacuum. The residue was poured into water whereupon the material crystallized. It was recrystallized from ethanol. Yield 22 grams; M.P. 160° to 162°C.

EXAMPLE 4

1-B-dimethylaminoethyl-5-phenyl-6-aza-7-chloro-2,3,4,5-tetrahydro-1H-1,5-benzodiazepin-2-one The compound was obtained in a manner analogous to example 3 starting from 30 grams of 5-phenyl-6-aza-7-chloro-2,3,4,5-tetrahydro-1H-1,5-benzodiazepin-2-one and 18 grams of 2-dimethylaminoethyl chloride. The evaporation residue was dissolved in methanol, the solution decolorized with activated carbon and the syrupy hydrochloride precipitated with isopropanolic HCl with the addition of ether. The hydrochloride was dissolved in water and the base crystallized from the aqueous solution by addition of ammonia. It was recrystallized from methanol/water. Yield 17 grams; M.P. 128° to 130°C.

EXAMPLE 5

1-Methyl-5-o-fluorophenyl-6-aza-7-chloro-2,3,4,5-tetrahydro-5H-1,5-benzodiazepin-2-one 49 grams of 5-o-fluorophenyl-6-aza-7-chloro-2,3,4,5-tetrahydro-1H-1,5-benzodiazepin-2-one were reacted with 30 grams of methyl iodide as in example 3 and purified. Yield 28 grams; M.P. 144° to 146°C.

EXAMPLE 6

1-Methyl-5-phenyl-6-aza-7-chloro-2,3,4,5-tetrahydro-1H-1,5-benzodiazepin-2,4-dione 3 grams of sodium hydride (80% in white oil) were added at room temperature with stirring under a nitrogen atmosphere to a solution of 31 grams of 5-phenyl-6-aza-7-chloro-2,3,4,5-tetrahydro-1H-1,5-benzodiazepin-2,4-dione in 250 ml of dimethyl formamide, then 23 ml of methyl iodide were added and the mixture heated for 2 hours at 70° to 80°C. There were dropped into the solution 20 ml of ethanol and then the mixture evaporated in a vacuum. The syrupy residue was agitated with water and then dissolved in hot ethanol. Upon cooling the product crystallized out. Yield 14 grams; M.P. 189° to 191°C.

The compounds of the invention are suited for the production of pharmaceutical compositions and preparations. The pharmaceutical compositions or drugs contain as the active material one or several of the compounds of the invention, in a given case in admixture with other pharmacologically or pharmaceutically effective materials. The production of the medicine can take place with the use of known and customary assistants.

Such carriers and assistants are set forth for example in Ullmann's Encyklopaedie der technischer Chemie, Vol. 4(1953), pages 1 to 39; Journal of Pharmaceutical Sciences, Vol. 52 (1963), pages 918 et seq.; H. va. Czetsch-Lindenwald, Hilfstoffe fuer Pharmazie und angrenzende Gebiete; as well as in Pharm. 2nd. Vol. 2 (1961), pages 72 et seq.; Dr. H. P. Fiedler, Lexicon der Hilfstoffe fuer Pharmazie, Kosmetik und angrenzende Gebiete, Cantor Kg. Aulendorf i. Wurtt, 1971.

Examples of such materials include gelatin, sucrose, pectin, starch, tylose, talc, lycopodium, silica, lactose, cellulose derivatives, micropulverized cellulose, stearates, e.g. methylstearate, and glyceryl stearate, emulsifiers, vegetable oils, water, pharmaceutically compatible mono- or polyvalent alcohols and polyglycols such as glycerine, mannitol, sorbitol, pentaerythritol, ethyl alcohol, diethylene glycol, triethylene glycol, ethylene glycol, propylene glycol, dipropylene glycol polyethylene glycol 400, as well as derivatives of such alcohols and polyglycols, dimethyl sulfoxide, esters of saturated and unsaturated fatty acids with mono- or polyvalent alcohols such as glycols, glycerine, diethylene glycol, pentaerythritol, sorbitol, mannitol, etc., e.g., glyceryl stearate, glyceryl palmitate, glyceryl oleate, ethylene glycol stearate; such esters of polyvalent alcohols can in a given case also be etherified, benzyl benzoate, dioxolane, glycerine formal, glycol, furfural, dimethyl acetamide, lactamide, lactates, e.g., ethyl lactate, ethyl carbonate, etc.

Furthermore there can be added preservatives, stabilizers, buffers, taste correctives, antioxidants and complex formers (for example ethylenediaminotetraacetic acid) and the like.

As antioxidants there can be used, for example, sodium meta bisulfite and ascorbic acid, as preservatives there can be used, for example, sorbic acid, p-hydroxybenzoic acid esters, e.g., methyl p-hydroxybenzoate and ethyl p-hydroxybenzoate and similar materials.

The pharmacological and galenical treatment of the compounds of the invention takes place according to the usual standard methods.

The drugs can be used enterally, parenterally, orally, perlingually or in the form of sprays.

The compounds can be delivered in the form of tablets, capsules, pills, dragees, suppositories, gels, cremes, powders, liquids, dusts or aerosols. As liquids there can be used oily or aqueous solutions or suspensions, emulsions, injectable aqueous or oily solutions or suspensions.

The drugs can be used in human medicine, in veterinary medicine, e.g., to treat cats, dogs, horses, sheep, cattle, goats and pigs or in agriculture. The drugs can be used alone or in admixture with other pharmacologically active materials.

The salts, e.g. the hydrochloride salts, are also useful as curing agents for melamine formaldehyde resins.

The addition of other medicinally active materials is also desirable, especially the addition or coronary widening, spasmolytic, ulcer healing or antihypertonically effective substances.

The compounds of the invention, for example, show in combat tests on mice (spontaneous aggressiveness), as well as a good spasmolytic activity. They also have antiulcer activity. Thus the compound of example 4 showed a 47% inhibition of the Indometacine ulcer at a dosage of 100 mg/kg.

The spasmolytic activity is comparable to that of the known drug Diazepam.

The lowest effective dosages in animal experiments, for example, are:

| Body Weight | |
|---|---|
| 1 mg/kg | orally (electro or cardiazole shock) |
| 1 mg/kg | intravenously (combat test) |

As a general range of dosage for activity (based on animal studies) there can be employed:

| Body Weight | |
|---|---|
| 1–50 mg/kg | orally |
| 1.5–25 mg/kg | sublingually |
| 0.2–10 mg/kg | intravenously |

The compounds of the invention have utility in treating ulcers, emotional problems, tension, anxiety, increased irritability, vegetative dystony and organic neuroses, as well as sleep disturbances, muscle spasms (as well as illnesses of the rheumatic circulation).

The entire disclosure of parent application Ser. No. 330,108 is hereby incorporated by reference.

The pharmaceutical preparations generally contain between 1 and 10 weight percent of the active component of the invention.

The compounds can be delivered in the form of tablets, capsules, pills, dragees, suppositories, gels, cremes, powders, liquids, dusts or aerosols. As liquids there can be used oily or aqueous solutions or suspensions, emulsions, injectable aqueous or oily solutions or suspensions. The preferred forms of use are tablets which contain between 2.5 and 10 mg of active material as solutions which contain between 0.1 and 1% of active material.

In individual doses the amount of active component of the invention an be used, for example, in an amount of 5 mg dispensed orally or 0.5 mg dispensed intravenously in each case calculated as the free base. These doses can be dispensed once or several times a day.

For example, there is recommended the use of 1 to 2 tablets containing 5 mg of active ingredient 3 times daily or intravenously the injection 1 to 2 times a day of a one ml ampoule having 0.5 mg of active material.

The acute toxicity of the compounds of the invention in the mouse (expressed by the LD 50 mg/kg method of Miller and Tainter, Proc. Soc. Exph. Biol. and Med., Vol. 57 (1944) pages 251 et seq.) in oral application is between 800 and 2000 mg/kg (or above 800 mg/kg).

The drugs can be used in human medicine, in veterinary medicine, e.g., to treat cats, dogs, horses, sheep, cattle, goats and pigs or in agriculture. The drugs can be used alone or in admixture with other pharmacologically active materials.

The starting material for example 4 is made by catalytically reduction of 2-carbethoxyacetylamino-3-nitro-5-chloropyridine (page 21) with Raney-nickel at 20 atmospheres and 40° to 50°C as described for example on page 20.

The starting materials for examples 1 and 2 are made as follows.

EXAMPLE A

A mixture of 120 grams, 2,6-dichlor-3-nitropyridine, 50 grams β-phenylaminopropionic acid, 65 grams sodiumcarbonate and 1 liter isopropanol is refluxed for 5 hours with stirring. The sodiumsalt of N-[3-Nitro-6-chloropyridyl-(2)]-N-phenyl-β-aminopropionic acid crystallizes on cooling. It is dissolved in 3 liters of water, the solution is filtered and acidified with acetic acid, whereupon the free acid precipitates as an oil. It crystallizes on rubbing and stirring and can be filtered by suction after 24 hours. Yield 70 grams; M.P. 95° to 96°C.

35 grams of this acid in 200 ml dioxane are hydrogenated with 10 grams Raney-nickel at 50 atmospheres and 60° to 70°C. The solution is then filtered and evaporated under reduced pressure. The sirupy residue (2-(N-β-carboxyethyl-phenylamino)-3-amino-6-chlorpyridine) can be used for further reaction.

EXAMPLE B

A mixture of 100 grams 2,6-dichlor-3-nitropyridine, 50 grams β-(o-fluorphenylamino)-propionic acid, 70 grams $K_2CO_3$ and 600 ml isopropanol is refluxed for 6 hours with stirring. The solution is filtered and evaporated under reduced pressure, the residue stirred with water and extracted with ether several times. Then the aqueous solution is diluted to 2 liters and acidified with acetic acid. The precipitated oil crystallizes slowly. The substance obtained is recrystallized from ethanol/gasoline. Yield 28 grams; M.P. 117° to 118°C.

35 grams of N-[3-nitro-6-chlorpyridyl-(2)]-N-(o-fluorophenyl)-β-aminopropionic acid thus produced are hydrogenated in 200 ml of dioxane with 15 grams Raney-nickel at 50 atmosphere and 50°C. After evaporation, the sirupy residue (2-(N-β-carbethoxyethyl-o-fluorphenylamino)-3-amino-6-chlorpyridine) is reacted further without purification.

I claim:

1. An azabenzo-1,5-diazepine of the formula

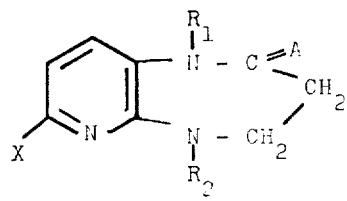

where X is halogen of atomic weight 9 to 80, $R_1$ is hydrogen, alkyl of 1 to 6 carbon atoms or alkyl of 1 to 6 carbon atoms having an omega dimethylamino or diethylamino substituent, $R_2$ is phenyl or phenyl having one halogen substituent of atomic weight 9 to 80, A is oxygen, sulfur, or alkylimino having 1 to 6 carbon atoms in the alkyl group, or the tautomeric forms of such compounds or salts of such compounds with pharmacologically acceptable acids.

2. A compound according to claim 1 wherein X is chlorine or fluorine.

3. A compound according to claim 2 wherein X is chlorine.

4. A compound according to claim 1 wherein $R_1$ is alkyl of 1 to 6 carbon atoms, $R_2$ is phenyl or phenyl substituted by chlorine or fluorine.

5. A compound according to claim 4 wherein A is sulfur.

6. A compound according to claim 4 wherein A is alkylimino having 1 to 6 carbon atoms in the alkyl group.

7. A compound according to claim 4 wherein A is oxygen.

8. A compound according to claim 7 wherein the chlorine or fluorine on the phenyl group is in the ortho position.

9. A compound according to claim 7 wherein $R_2$ is phenyl.

10. A compound according to claim 9 wherein $R_1$ is methyl.

11. A compound according to claim 7 wherein $R_2$ is fluorophenyl.

12. A compound according to claim 11 wherein $R_2$ is o-fluorophenyl.

13. A compound according to claim 12 wherein $R_1$ is methyl.

14. A compound according to claim 1 wherein $R_1$ is hydrogen.

15. A compound according to claim 1 wherein $R_1$ is alkyl or 1 to 6 carbon atoms.

16. A compound according to claim 1 wherein $R_1$ is alkyl of 1 to 6 carbon atoms substituted by an omega dimethylamino or diethylamino group.

* * * * *